(12) United States Patent
Tozawa (10) Patent No.: US 10,892,514 B2
(45) Date of Patent: Jan. 12, 2021

(54) METHOD OF MANUFACTURING SECONDARY BATTERY STACK

(71) Applicant: TOYOTA JIDOSHA KABUSHIKI KAISHA, Toyota (JP)

(72) Inventor: Takanori Tozawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 32 days.

(21) Appl. No.: 15/837,573

(22) Filed: Dec. 11, 2017

(65) Prior Publication Data

US 2018/0175436 A1 Jun. 21, 2018

(30) Foreign Application Priority Data

Dec. 15, 2016 (JP) ................. 2016-243466

(51) Int. Cl.
| | | |
|---|---|---|
| *H01M 10/04* | (2006.01) | |
| *H01M 2/16* | (2006.01) | |
| *H01M 2/10* | (2006.01) | |
| *H01M 2/02* | (2006.01) | |

(52) U.S. Cl.
CPC ..... *H01M 10/0481* (2013.01); *H01M 2/0267* (2013.01); *H01M 2/1077* (2013.01); *H01M 2/1653* (2013.01); *H01M 10/0413* (2013.01)

(58) Field of Classification Search
CPC ......... H01M 10/0481; H01M 10/0413; H01M 2/14; H01M 2/145; H01M 2/16; H01M 2/0267; H01M 2/1077; H01M 2/1653; H01M 2/10; H01M 2/1016; B29C 67/0011; B29C 67/0048

USPC ..... 29/623.1–623.5, 730, 731, 763; 429/452, 429/467–470, 535, 156–159
See application file for complete search history.

(56) References Cited

U.S. PATENT DOCUMENTS

| | | | | |
|---|---|---|---|---|
| 4,076,787 A | * | 2/1978 | Ervin | ............ B29C 51/00 264/250 |
| 2013/0273397 A1 | | 10/2013 | Watanabe et al. | |
| 2014/0041901 A1 | * | 2/2014 | Tozawa | ............ H01M 2/18 174/250 |

FOREIGN PATENT DOCUMENTS

| | | | |
|---|---|---|---|
| JP | 2005-339929 A | | 12/2005 |
| JP | 2008-016259 A | | 1/2008 |
| JP | 2008053072 A | * | 3/2008 |
| JP | 2010143162 A | * | 7/2010 |
| JP | 2012-129043 A | | 7/2012 |

OTHER PUBLICATIONS

Machine translation of JP 2008053072 date unknown.*
Machine translation of JP 2010143162 date unknown.*

* cited by examiner

*Primary Examiner* — John L Goff, II
(74) *Attorney, Agent, or Firm* — Sughrue Mion, PLLC (57) ABSTRACT

A method of manufacturing a secondary battery stack which is a stacked body in which secondary batteries and resin members are alternately stacked, includes: a first pressing step of pressing the resin member before being stacked with the secondary battery, in a direction in which the resin member is to be stacked; a stacking step of stacking the resin member subjected to the first pressing step with the secondary battery into the stacked body; and a second pressing step of pressing the stacked body in a stacking direction in which the secondary batteries and the resin members are alternately stacked.

5 Claims, 6 Drawing Sheets

METHOD OF MANUFACTURING SECONDARY BATTERY STACK

INCORPORATION BY REFERENCE

The disclosure of Japanese Patent Application No. 2016-243466 filed on Dec. 15, 2016 including the specification, drawings and abstract is incorporated herein by reference in its entirety.

BACKGROUND

1. Technical Field

The disclosure relates to a method of manufacturing a secondary battery stack.

2. Description of Related Art

A secondary battery stack formed by integrally assembling a plurality of secondary batteries is used for various purposes. As the secondary battery stack, there is a secondary battery stack that uses a secondary battery having a rectangular outer shape. In the secondary battery stack described above, in general, secondary batteries and frame members having a substantially flat plate shape are stacked in a thickness direction of the secondary battery.

As an example of the secondary battery stack having the configuration described above, there is a "battery pack 1" described in Japanese Unexamined Patent Application Publication No. 2012-129043 (JP 2012-129043 A). The "battery pack 1" in JP 2012-129043 A is formed by stacking "single cells 10" (secondary batteries) and "partition members 40" (frame members) as illustrated in FIGS. 2 and 14. In addition, as illustrated in FIG. 1 in JP 2012-129043 A, the stacked body is formed in one body by being bound with "end plates 31" and a "band 32". In the technique of JP 2012-129043 A, a binding force is applied to the "battery pack 1" by the "band 32". The application of the binding force is needed to suppress the expansion of the "single cells 10" (refer to [0023] in JP 2012-129043 A).

However, the technique described above has the following problem. There may be cases where a short-circuit failure occurs in the "single cell 10" which is a portion of the "battery pack 1". It has been known that a cause of the problem is the application of the binding force. Since pressing is performed in the stacking direction when the stacked body is bound with the "band 32", the pressure inside the "single cell 10" also increases due to the pressing. In addition, the pressing is performed strongly enough to deform the "partition member 40" to some extent. Therefore, the increase in the internal pressure at this time may cause a short circuit due to small metallic foreign matter incorporated into the "single cell 10" to some extent.

SUMMARY

The disclosure provides a method of manufacturing a secondary battery stack in which a needed load is continuously applied to a completed secondary battery stack while the application of a pressing force to a secondary battery is suppressed at the time of assembly.

An aspect relates to a method of manufacturing a secondary battery stack which is a stacked body in which secondary batteries and resin members are alternately stacked. The method includes a first pressing step of pressing the resin member before being stacked with the secondary battery, in a direction in which the resin member is to be stacked; a stacking step of stacking the resin member subjected to the first pressing step with the secondary battery into the stacked body; and a second pressing step of pressing the stacked body in a stacking direction of the stacked body in which the secondary batteries and the resin members are alternately stacked.

According to the aspect, the first pressing step is performed solely on the resin member and is not performed on the secondary battery. Therefore, in the first pressing step, a relatively high pressing load can be applied to the resin member. The resin member pressed in advance as described above is stacked with the secondary battery in the stacking step. Therefore, there is no need to apply an excessive load in the second pressing step in which the stacked body is pressed. Even in this case, a needed load is applied to the completed secondary battery stack due to the effects achieved by performing the first pressing step.

The method according to the aspect may further include a step of increasing a temperature of the resin member during the first pressing step to a temperature in a range in which the resin member is not melted. According to the aspect, in a state in which the resin member is softened due to the increase in the temperature, the first pressing step is performed, and thus the resin member can be more reliably compressed.

In the method according to the aspect, the resin member may undergo creep deformation during the first pressing step. According to the aspect, the application of an insufficient load to the completed secondary battery stack is prevented, and a needed load is relatively continuously applied thereto.

In the method according to the aspect, the pressing in the second pressing step may be performed with a weaker pressing force than a pressing force during the first pressing step. According to the aspect, damage to the secondary battery due to the pressing load can be prevented.

According to the aspect, the method of manufacturing a secondary battery stack in which a needed load is continuously applied to the completed secondary battery stack while the application of a pressing force to the secondary battery is suppressed at the time of assembly is provided.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, exemplary embodiments will be described in detail with reference to accompanying drawings. As one of embodiments, a method of manufacturing a secondary battery stack 1 illustrated in FIG. 1 will be described. First, the secondary battery stack 1 will be briefly described. The secondary battery stack 1 in FIG. 1 is formed by alternately stacking a number of cells 2 and frame members 3 in a thickness direction of the cells 2 and the frame members 3.

Figure 2:
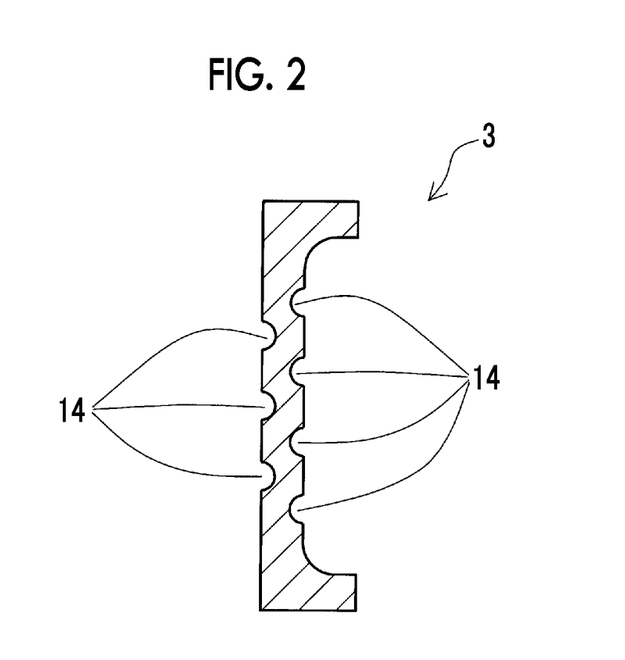
FIG. 2 is a sectional view of a frame member having ventilation grooves.

The cell 2 is a lithium-ion secondary battery or another type of secondary battery, and has a flat outer shape. More specifically, the cell 2 is formed by storing a wound electrode body in a square metallic case made of aluminum or the like. The wound electrode body is formed by alternately superimposing positive and negative electrode plates having a band shape with separators interposed therebetween, winding the superimposed body, and compressing the wound body into a flat shape. The frame member 3 is a resin member that has a substantially flat plate shape and is formed in a frame shape in which the cell 2 is accommodated. As illustrated in FIG. 2, the frame member 3 may have ventilation grooves 14 formed in a flat portion thereof. The ventilation groove 14 has a shape for dissipating heat of the cell 2 in a state being used as the secondary battery stack 1. In the following description, the ventilation grooves 14 are omitted for simplicity.

Figure 1:
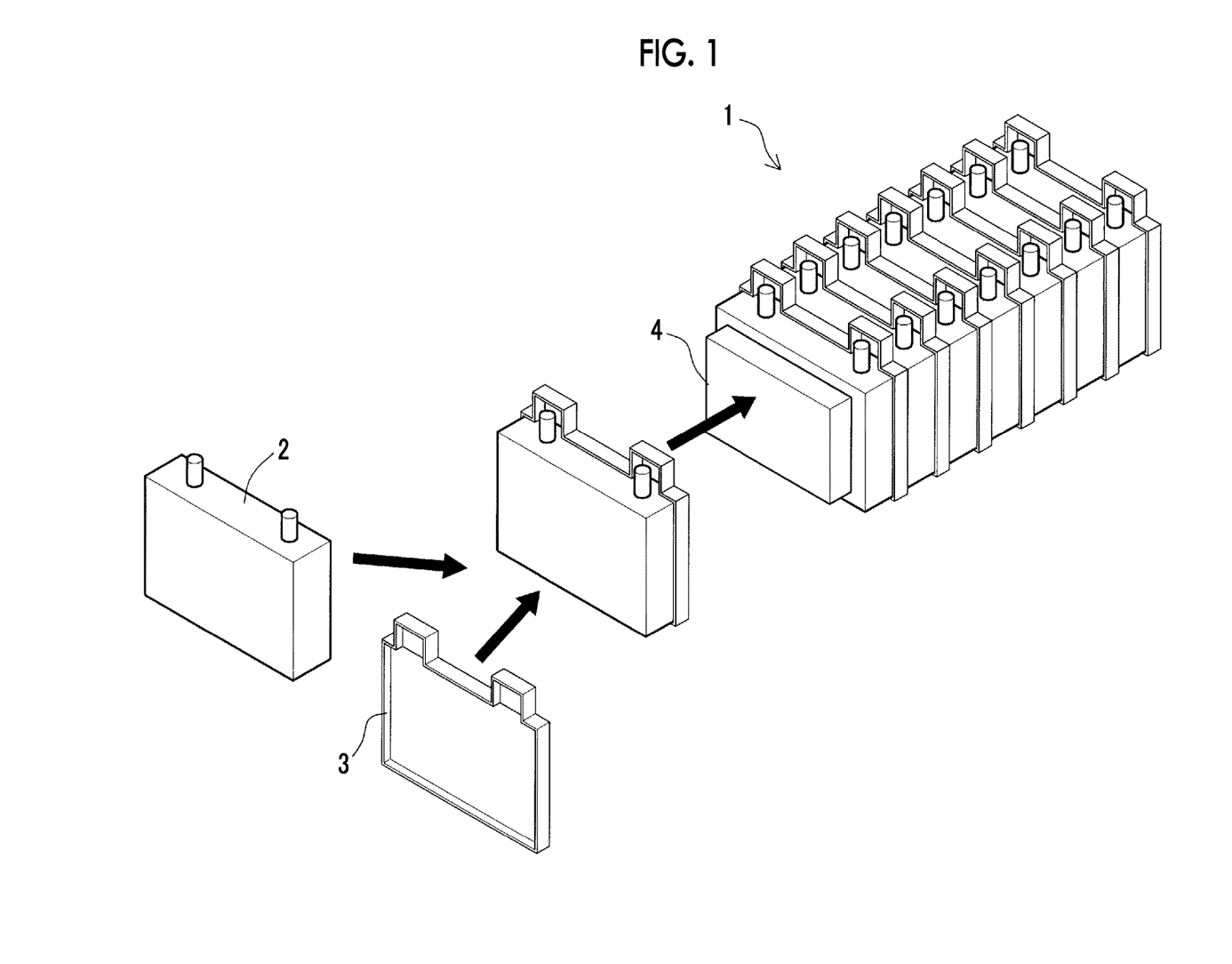
FIG. 1 is a perspective view of a secondary battery stack manufactured in a manufacturing method according to an embodiment.

In addition, the end portion of the secondary battery stack 1 on the front side in FIG. 1 is provided with an end surface member 4. The end surface member 4 is made of a resin like the frame member 3, and both ends of the secondary battery stack 1 are members made of a resin. In addition, although not illustrated, a binding member, for example, as indicated by "20" in FIG. 1 of JP 2012-129043 A may also be appropriately provided in the secondary battery stack 1.

In the manufacturing method of the embodiment, it is assumed that both the cells 2 and the frame members 3 are supplied as finished products as single bodies of the cells 2 and the frame members 3. A process of assembling the cells 2 and the frame members 3 as the single bodies of the cells 2 and the frame members 3 into a stacked form of the secondary battery stack 1 and fixing the assembly is an object to which the manufacturing method of the embodiment is applied. In the embodiment, the secondary battery stack 1 is manufactured in the following procedures. Hereinafter, each procedure will be sequentially described. 1. Pre-pressing step of the frame members 3 (first pressing step)→2. Stacking step of the cells 2 and the frame members 3→3. Main pressing step of the stacked body (second pressing step)

Figure 3:
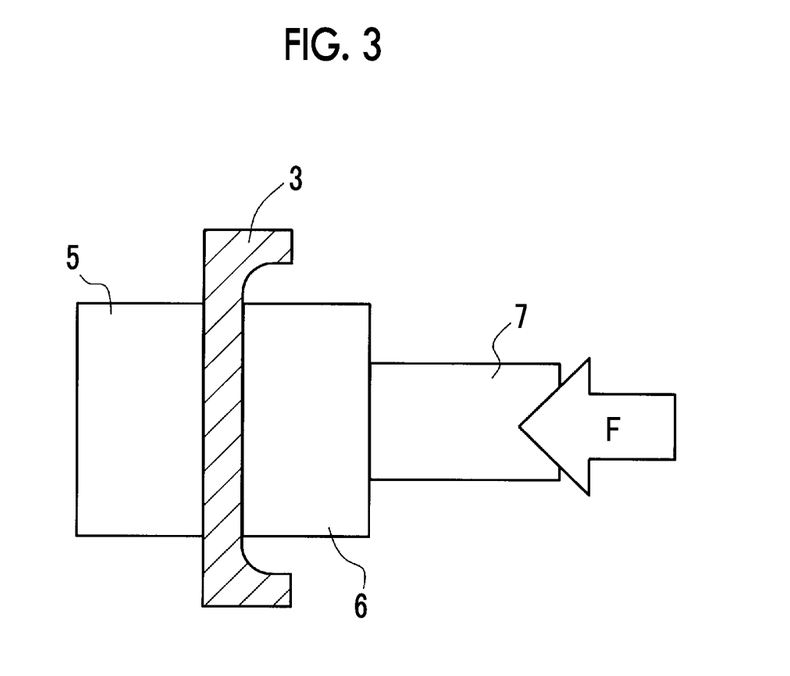
FIG. 3 is a schematic view showing a pre-pressing step.

First, the pre-pressing step of "1." will be described. The pre-pressing step is a step of pressing the frame member 3 in the thickness direction thereof as illustrated in FIG. 3. The pre-pressing step is performed on the frame member 3 as an object in an independent state before being assembled with the cell 2. That is, the cell 2 is not an object of the pre-pressing step. In the pre-pressing step in FIG. 3, the flat portion of the frame member 3 is interposed between a fixed block 5 and a movable block 6. In addition, the movable block 6 is pressed against the fixed block 5 by a cylinder 7 (pressing force F). Accordingly, the flat portion of the frame member 3 is pressed in the thickness direction. As a matter of course, the pressing direction is a direction in which the frame member 3 and the cell 2 are to be stacked together. A generation source of the pressing force F of the cylinder 7 may be any of pneumatic pressure, hydraulic pressure, and electromagnetic force. The portion of the frame member 3 pressed in the pre-pressing step undergoes creep deformation. As a matter of course, the content of the deformation is compression in the thickness direction. The compression due to the creep deformation is not completely recovered even after the pressing force F is released and remains to some extent.

Figure 4:
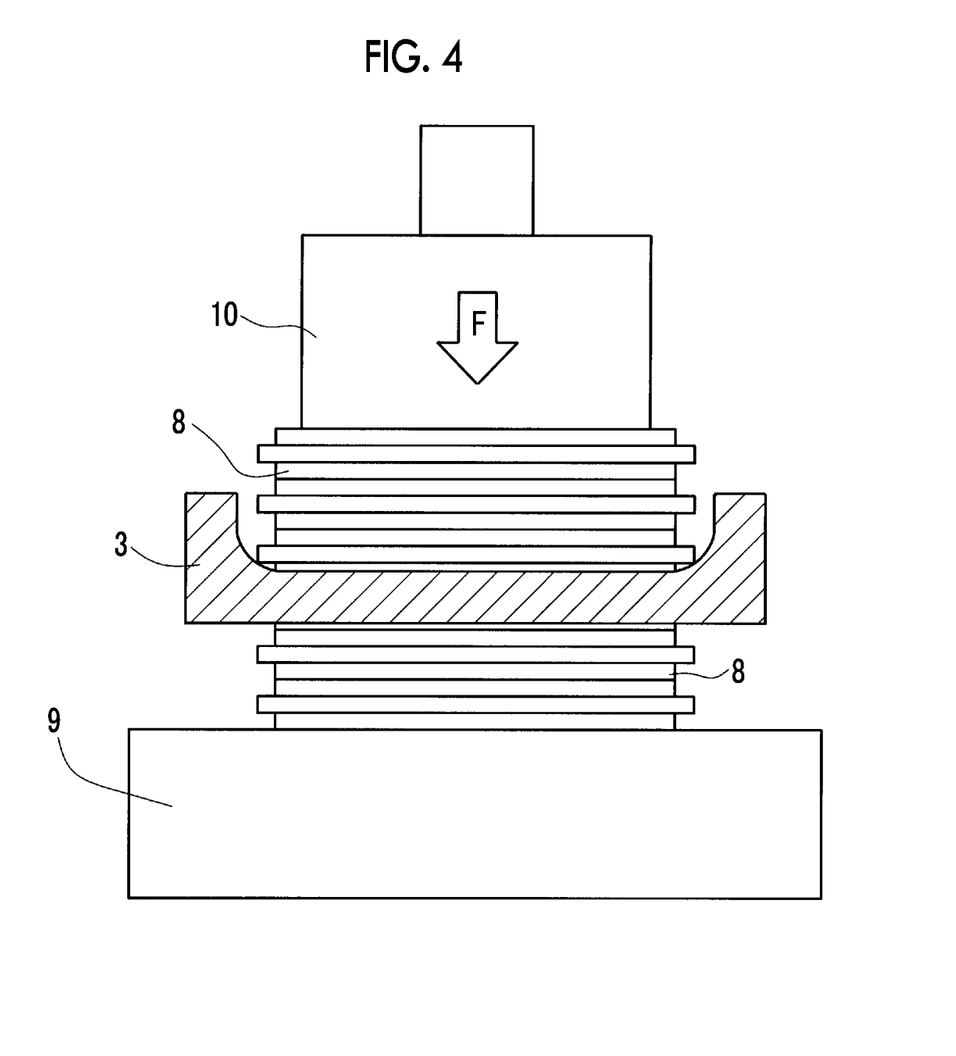
FIG. 4 is a schematic view illustrating a situation in which a test for acquiring the relationship between a stroke and a load during the pre-pressing step is conducted.

A situation of pressing in the pre-pressing step will be described in more detail with reference to FIGS. 4 and 5. FIG. 4 illustrates a situation in which a test for acquiring the relationship between a compression stroke and a load is conducted. FIG. 4 illustrates a situation in which the frame member 3 vertically interposed between dummy plates 8 is placed on a base plate 9 and is pressed from above by an autograph 10. The base plate 9 is immovable. The base plate 9 and the lower dummy plate 8 correspond to the fixed block 5, and the upper dummy plate 8 corresponds to the movable block 6. While the upper dummy plate 8 is pressed downward by the autograph 10, the stroke (lowering amount) and the pressing force F at this time can be measured.

Figure 5:
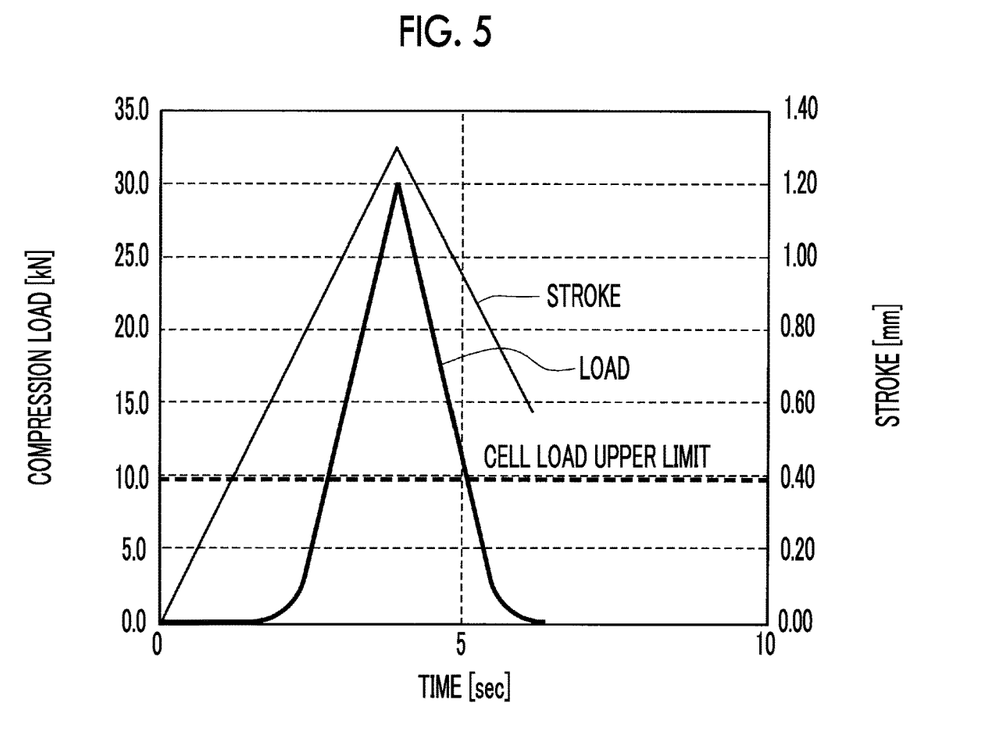
FIG. 5 is a graph showing results obtained by the test in FIG. 4.

FIG. 5 illustrates a situation in which a load value of the pressing force F increases as the stroke linearly increases with time in the apparatus in FIG. 4. The stroke reaches 1.3 mm at about four seconds after the start of the pressing, and thereafter the stroke linearly decreases on the contrary. The graph in FIG. 5 refers to a case where the contact area of the dummy plate 8 to the frame member 3 is 50 $cm^2$ for each surface.

It can be seen from FIG. 5 that the load value hardly increases until the stroke reaches about 0.6 mm even when the pressing is started. After the stroke exceeds 0.6 mm, the load value rapidly increases, and the load value reaches about 30 kN at the maximum stroke. After the maximum stroke, both the stroke and the load value decrease. However, the decrease in the load value is faster than that in the stroke, and the load becomes substantially zero when the stroke returns to about 0.6 mm. Thereafter, there is a situation in which, even when the stroke of the autograph 10 is further returned, the compression deformation of the frame member 3 is not recovered. That is, the frame member 3 is in a state of being subjected to creep deformation.

In FIG. 5, the upper limit of the load that is allowed to be applied to the cell 2 assembled with the frame member 3 is set to about 10 kN. Since the maximum load value in the graph in FIG. 5 is about 30 kN as described above, the maximum load value significantly exceeds the allowable upper limit 10 kN. That is, the maximum load in the graph in FIG. 5 is a load high enough to cause a small short circuit in the cell 2 when the maximum load is applied to the cell 2. However, as described with reference to FIG. 3, actually, no compression load is applied to the cell 2 in the pre-pressing step. Therefore, in the pre-pressing step of the embodiment, a relatively high compression load can be applied.

Figure 6:
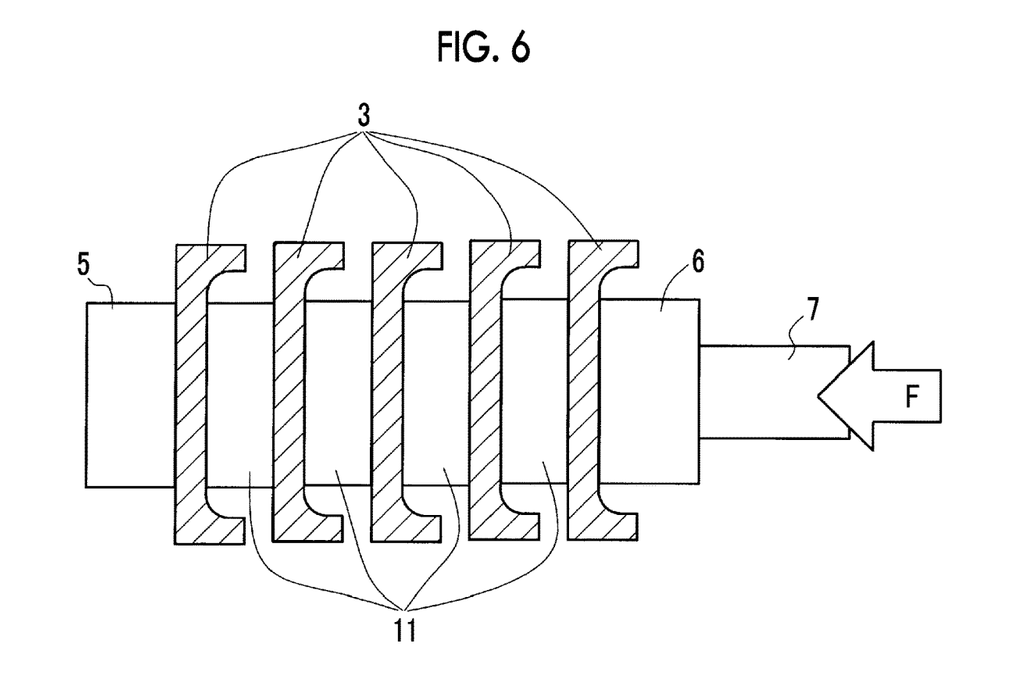
FIG. 6 is a schematic view illustrating a case where a plurality of frame members is pressed at once in the pre-pressing step.

In addition, the autograph 10 is used in FIG. 4 because there is a need to read the values of the compression stroke and the load as the test. In actual mass production, an appropriate cylinder 7 as illustrated in FIG. 3 is sufficient. Furthermore, in actual mass production, as illustrated in FIG. 6, a plurality of frame members 3 may be pressed at once. In FIG. 6, in addition to the fixed block 5 and the movable block 6 described above, intermediate blocks 11 are also used. Here, the fixed block 5, the movable block 6, the intermediate blocks 11, and the dummy plates 8 may be anything as long as strength to withstand the pressing load in the pre-pressing step can be provided, and may also be suitable metal members. The members can be reused repeatedly.

Figure 7:
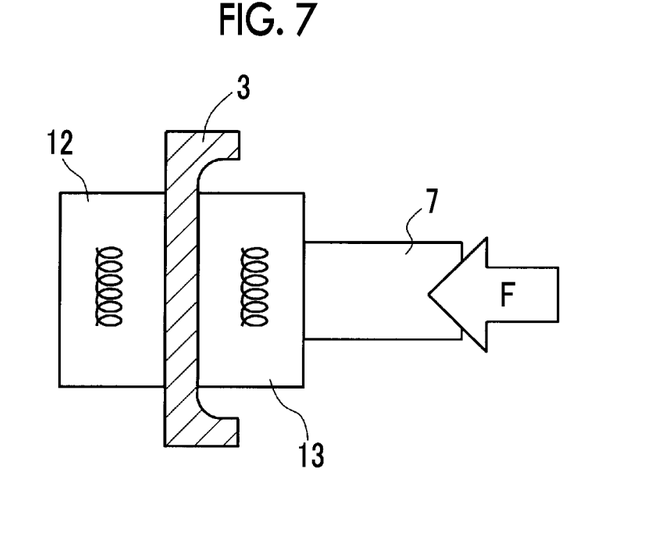
FIG. 7 is a schematic view illustrating the pre-pressing step in a case where temperature adjustment is performed.

In the description provided above, temperature adjustment is not particularly performed in the pre-pressing step. However, as illustrated in FIG. 7, temperature adjustment may also be performed in the pre-pressing step. In FIG. 7, instead of the fixed block 5 and the movable block 6 in FIG. 3, a fixed block 12 and a movable block 13 with a heater therein are used. Furthermore, it is desirable that a temperature sensor such as a thermistor is also provided in the fixed block 12 or the movable block 13. Accordingly, the pre-pressing step can be performed while the temperature of the frame member 3 is increased to some extent.

The increased temperature of the frame member 3 in this case is set to such a degree that the resin as the material of the frame member 3 is softened to some extent but is not melted. As the resin as the material of the frame member 3, a thermoplastic resin such as polyethylene or polypropylene is usually used. Therefore, the increased temperature of the frame member 3 need not be an excessively high temperature, and is sufficiently about 50° C. or higher and 120° C. or lower. As described above, in the pre-pressing step in the case where the temperature adjustment is performed, the compression load may be lower than the level described above, and may be equal to or lower than a compression load in the main pressing step described later.

In addition, the fixed block 12 and the movable block 13 in FIG. 7 are drawn on the assumption that an electric heater is embedded therein. However, a heating method is not limited thereto, and may be an IH heater, an infrared type heater, or a heater using circulation of a thermal fluid. In addition, the fixed block 5 and the movable block 6 in which no heater is embedded are used, and the heater may be separately disposed in the vicinity of the fixed block 5 and the movable block 6. As a matter of course, even in the case where a number of frame members 3 are pressed at once as in FIG. 6, it is possible to adopt the temperature adjustment method.

Subsequently, the stacking step of "2." will be described. The stacking step is not so special, and is to stack the cells 2 and the frame members 3 into the form of a stacked body like the secondary battery stack 1 illustrated in FIG. 1 by alternately superimposing a number of cells 2 and a number of frame members 3 in the thickness direction thereof. Here, it should be noted that as the frame members 3, those having creep deformation through the pre-pressing step described above are used.

Figure 8:
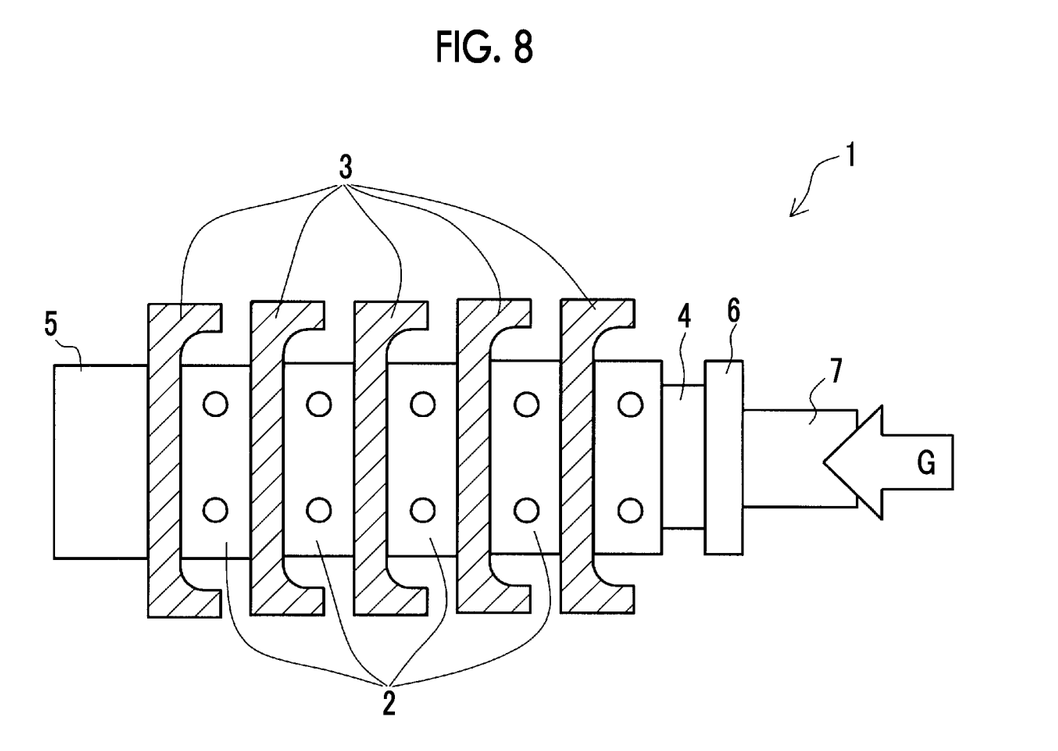
FIG. 8 is a schematic view illustrating a main pressing step.

Next, the "main pressing step" of "3." will be described. In the main pressing step, the entirety of the secondary battery stack 1 (including the end surface members 4) stacked in the stacking step described above is pressed. The pressing direction is the longitudinal direction of the secondary battery stack 1, that is, the thickness direction of the individual cells 2 or the frame members 3. The pressing in the main pressing step may be performed as illustrated in FIG. 8 using the fixed block 5 and the cylinder 7 described above. The secondary battery stack 1 is integrated by the main pressing. A binding member may be appropriately attached thereto.

However, a pressing force G in the main pressing step is set to be weaker than the pressing force F in the case where the temperature adjustment is not performed in the pre-pressing step. This is because the cell 2 is also the object of the pressing in the main pressing step. In the main pressing step, there is a need to cause the pressing to be performed at a moderately weak force so as not to cause a small short circuit in the cell 2. On the other hand, the pressing after the assembly of the secondary battery stack 1, that is, the main pressing has to be performed. When the main pressing is not performed, on the contrary, an abnormality occurs in the cell 2. In the cell 2, the stacked body of the positive and negative electrode plates is in a state of being hung from a lid member of an exterior case by a current collecting member. Therefore, there is a need to press the cell 2 to some extent such that the stacked body is in an interposed form. Otherwise, the stacked body of the electrode plates may be torn away from the current collecting member due to vibration or the like after the start of use.

Figure 9:
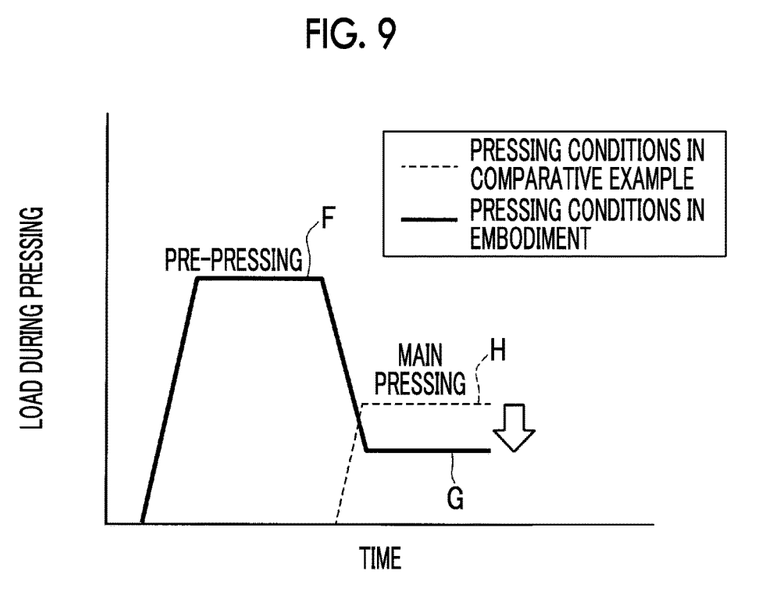
FIG. 9 is a graph showing a transition in the load through the pre-pressing step and the main pressing step.

FIG. 9 shows a transition in the load through the pre-pressing step and the main pressing step. As shown in FIG. 9, in the embodiment, the pressing force G in the main pressing step is sufficiently lower than the pressing force F in the pre-pressing step. This can be achieved because the frame member 3 is subjected to creep deformation in advance in the pre-pressing step as described above. When the secondary battery stack 1 is assembled and the main pressing step is performed without the pre-pressing step, a pressing force H higher than the pressing force G is needed as shown in FIG. 9. Therefore, there may be cases where a small short circuit occurs in the cell 2 due to the pressing force H. In addition, when the pre-pressing step is not performed and the main pressing step is performed with the insufficient and weak pressing force G, there may be cases where problems occur due to vibration after the start of use as described above.

Figure 10:
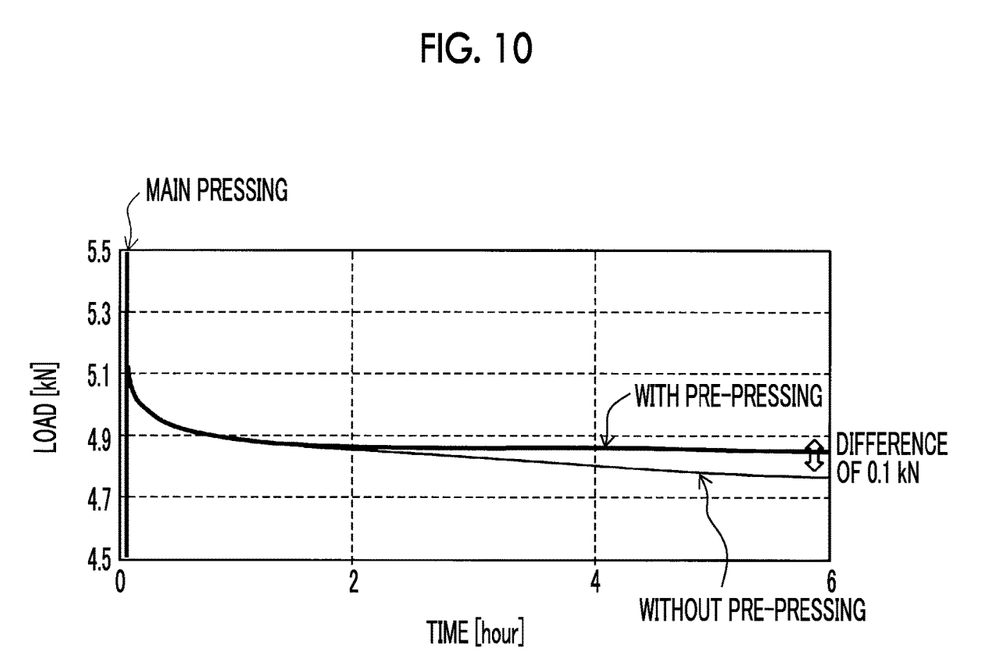
FIG. 10 is a graph showing a change in the load applied to a cell with time after the main pressing step in comparison between the presence and absence of the pre-pressing step.

The reason that the difference occurs depending on the presence or absence of the pre-pressing step as described above will be described with reference to FIG. 10. FIG. 10 shows a change in the load applied to the cell 2 with time after the main pressing step. The graph in FIG. 10 is based on the results measured by using the autograph 10 illustrated in FIG. 4 instead of the cylinder 7. In FIG. 10, the results of measuring the load applied to the cell 2 for six hours after the main pressing step is performed with a load value of 5.5 kN in the case where the pre-pressing step is performed and in the case where the pre-pressing step is not performed are shown. The load value during the pre-pressing step in the case where the pre-pressing step is performed is set to 30 kN as shown in FIG. 5.

Referring to FIG. 10, there is a situation in which in the case where the pre-pressing step is performed, the decrease in the load value converges in about two hours after the end of the main pressing and thereafter the stabilized load is continuously applied to the cell 2. Therefore, problems are unlikely to occur after the start of use. This is because the frame member 3 is already subjected to creep deformation during the pre-pressing step and creep deformation hardly proceeds after the main pressing step.

On the other hand, in the case where the pre-pressing step is not performed, the decrease in the load value continues gradually even after about six hours passed after the end of the main pressing. At the time point after the six hours, the difference in the load value from that in the case where the pre-pressing step is performed is opened to about 0.1 kN. Therefore, the load applied to the cell 2 becomes insufficient during use and problems may occur due to vibration after the start of use. This is because the frame member 3 that is not subjected to creep deformation in advance is used and creep deformation further proceeds after the main pressing step. In the case where the pre-pressing step is not performed, in order to compensate for an excessive decrease in the load, the moderately strong pressing force H is needed during the main pressing step as shown in FIG. 9. However, on the contrary, the strong pressing force H causes problems due to the excessive pressure as described above.

As described above in detail, according to the embodiment, when the secondary battery stack 1 in which the cells 2 and the frame members 3 are alternately stacked is manufactured, the pre-pressing step in which the frame member 3 is solely pressed and subjected to creep deformation before the stacking step is performed. In addition, as described above, the frame members 3 that are subjected to creep deformation in advance are stacked with the cells 2. Accordingly, a manufacturing method in which the pressing force in the main pressing step performed in the stacked state is suppressed to be a moderately weak force to such a degree at which no small short circuit occurs in the cell 2 and a needed load is continuously applied to the completed secondary battery stack 1 is realized. Accordingly, the necessity of using an excessively strong exterior body for the cell 2 is excluded.

The embodiment is merely an example and does not limit the disclosure at all. Therefore, various improvement and modifications are naturally possible. For example, the cell 2 may be a type of secondary battery other than a lithium-ion secondary battery. In addition, the frame member 3 may be a resin plate having a simple flat plate shape. Furthermore, the numerical values shown as the load values, strokes, and the like are merely examples for the case of the cell 2 having a specific size.

What is claimed is:

1. A method of manufacturing a secondary battery stack which is a stacked body in which secondary batteries and resin members are alternately stacked, the method comprising:

a first pressing step of pressing a resin member before being stacked with a secondary battery, in a direction in which the resin member is to be stacked, wherein the first pressing step includes pressing a flat portion of the resin member so as to compress the flat portion of the resin member in a thickness direction of the resin member, wherein a pressing force during the first pressing step is more than an upper limit of a load that is allowed to be applied to the secondary battery before causing a short circuit in the secondary battery;

a stacking step of stacking the resin member subjected to the first pressing step with the secondary battery into the stacked body; and a second pressing step of pressing the stacked body in a stacking direction in which the secondary batteries and the resin members are alternately stacked, wherein the pressing in the second pressing step is performed with a weaker pressing force than the pressing force during the first pressing step, wherein the resin member undergoes creep deformation during the first pressing step.

2. The method according to claim 1, wherein the second pressing is performed on a battery surface of the secondary battery that corresponds to a region of the resin member that is pressed during the first pressing.

3. The method according to claim 1, wherein the resin member is made of a thermoplastic resin, and during the first pressing step the resin member is heated to a range of 50-120° C.

4. The method according to claim 1, wherein the upper limit of the load that is allowed to be applied to the secondary battery is 10 kN.

5. The method according to claim 4, wherein a load of the first pressing step is 30 kN and a load of the second pressing step is 5.5 kN.

* * * * *